(12) United States Patent
Tow et al.

(10) Patent No.: US 11,871,736 B1
(45) Date of Patent: Jan. 16, 2024

(54) FISHING LURE CLAPPER DEVICE

(71) Applicants: QUANTUM INNOVATIONS, INC., Central Point, OR (US); Quinn Adair Hansen, Sandstone, MN (US)

(72) Inventors: Thomas Leroy Tow, Fairmont, MN (US); Norman L. Kester, Rogue River, OR (US)

(73) Assignee: Quantum Innovations, Inc., Central Point, OR (US)

( * ) Notice: Subject to any disclaimer, the term of this patent is extended or adjusted under 35 U.S.C. 154(b) by 35 days.

(21) Appl. No.: 17/893,567

(22) Filed: Aug. 23, 2022

Related U.S. Application Data

(60) Provisional application No. 63/238,882, filed on Aug. 31, 2021.

(51) Int. Cl.
*A01K 85/01* (2006.01)

(52) U.S. Cl.
CPC ............ *A01K 85/01* (2013.01); *A01K 85/017* (2022.02)

(58) Field of Classification Search
CPC .............................. A01K 85/01; A01K 85/017
See application file for complete search history.

(56) References Cited

U.S. PATENT DOCUMENTS

| | | |
|---|---|---|
| 3,112,576 A | 12/1963 | Tay |
| 3,142,927 A | 8/1964 | Stram |
| 4,202,127 A * | 5/1980 | Marek ................. A01K 85/14 43/42.31 |
| 4,823,501 A | 4/1989 | Standish, Jr. |
| 5,001,856 A | 3/1991 | Gentry |
| 5,003,723 A * | 4/1991 | Dutcher ................ A01K 85/14 43/42.27 |
| 5,566,497 A | 10/1996 | Oesterreich |
| 6,493,984 B1 * | 12/2002 | Bechhold ............. A01K 91/08 43/42.46 |
| 6,955,004 B2 | 10/2005 | Phipps |
| 7,325,357 B2 | 2/2008 | Wiskur |
| 7,380,366 B1 * | 6/2008 | Barrow ................. A01K 91/08 43/42.22 |
| 7,627,978 B2 * | 12/2009 | Davis .................... A01K 85/18 43/42.49 |
| 10,426,149 B1 * | 10/2019 | Coxey .................. A01K 85/14 |

(Continued)

FOREIGN PATENT DOCUMENTS

| | | | | |
|---|---|---|---|---|
| EP | 1428430 A1 * | 6/2004 | ............ | A01K 85/14 |
| JP | 2003061520 A * | 3/2003 | ............ | A01K 85/14 |
| WO | WO-03020021 A1 * | 3/2003 | ............ | A01K 85/14 |

*Primary Examiner* — Christopher P Ellis
(74) *Attorney, Agent, or Firm* — Jerry Haynes Law

(57) ABSTRACT

A fishing lure clapper device may include a fishing lure such as a spoon lure or spinner lure. A strike member may be loosely attached to the fishing lure. The strike member may have at least one water flow contact surface. The water flow contact surface may be at least partially concave and/or at least partially convex. Accordingly, throughout retrieval of the lure on a fishing line through water in a water body, flow of the water against the water flow contact surface of the strike member may cause the strike member to move at random orientations and repetitively strike or clap against the side of the fishing lure, creating vibration and clicking or clapping sounds in the water to attract fish and agitate or entice the fish to strike the lure.

20 Claims, 2 Drawing Sheets

(56) References Cited

U.S. PATENT DOCUMENTS

| | | | |
|---|---|---|---|
| 2004/0216359 A1* | 11/2004 | Mitchell | A01K 85/00 |
| | | | 43/42.36 |
| 2005/0150151 A1* | 7/2005 | Wiskur | A01K 85/01 |
| | | | 43/42.31 |
| 2013/0152450 A1* | 6/2013 | Myerson | A01K 85/01 |
| | | | 43/42.31 |
| 2017/0142947 A9 | 5/2017 | Myerson | |
| 2018/0000057 A1* | 1/2018 | Jarboe, Jr. | A01K 85/01 |
| 2018/0007876 A1* | 1/2018 | Senter | A01K 85/14 |
| 2019/0216067 A1* | 7/2019 | Naig | A01K 85/01 |
| 2022/0264857 A1* | 8/2022 | Ruboyianes | A01K 85/1853 |

* cited by examiner

FISHING LURE CLAPPER DEVICE

CROSS REFERENCE TO RELATED APPLICATIONS

This application claims the benefit of U.S. provisional application No. 63/238,882, filed Aug. 31, 2021, and entitled FISHING LURE CLAPPER DEVICE, which provisional application is incorporated by reference herein in its entirety.

FIELD OF THE INVENTION

The present invention relates generally to a fishing lure clapper device. More so, the present invention relates to a fishing lure clapper device which includes a fishing lure such as a spoon lure or spinner lure. A strike member may be loosely attached to the fishing lure. The strike member may have at least one water flow contact surface. The water flow contact surface may be at least partially concave and/or at least partially convex. Accordingly, throughout retrieval of the lure on a fishing line through water in a water body, flow of the water against the water flow contact surface of the strike member may cause the strike member to move at random orientations and repetitively strike or clap against the side of the fishing lure, creating vibration and clicking or clapping sounds in the water to attract fish and agitate or entice the fish to strike the lure.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

Figure 1:
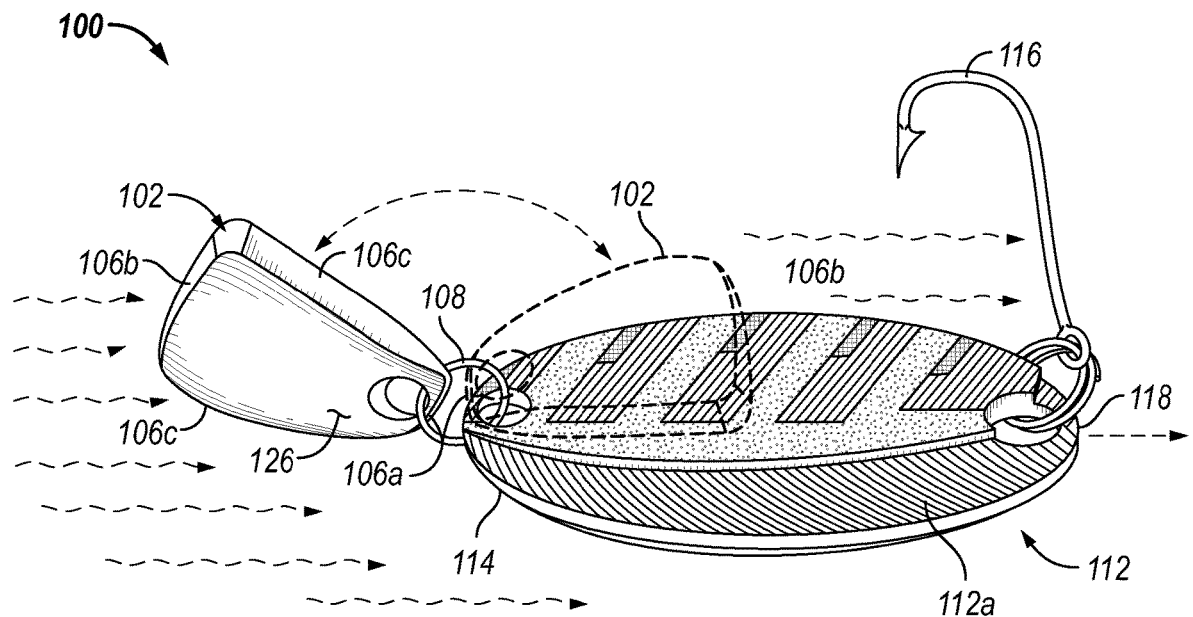
FIG. 1 illustrates a perspective view of a first illustrative embodiment of an exemplary fishing lure clapper device, showing a strike member attached to a spoon lure.
Figure 2:
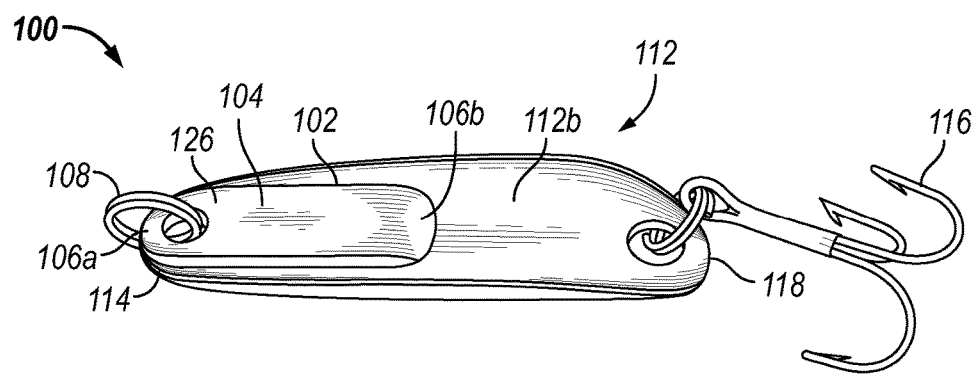
FIG. 2 illustrates a perspective view of a second embodiment of a fishing lure clapper device, showing a second embodiment of a strike member attached to a spinner lure, in accordance with an embodiment of the present invention.
Figure 3:
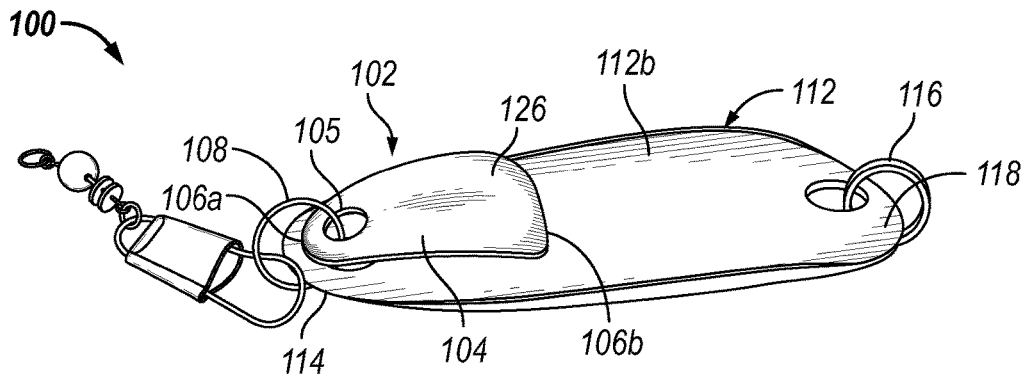
FIG. 3 illustrates a perspective view of a third embodiment of a fishing lure clapper device, showing a third embodiment of a strike member attached to a spinner lure, in accordance with an embodiment of the present invention.

A fishing lure clapper device 100 is referenced in FIGS. 1-3. The fishing lure clapper device 100, hereafter "device 100", may include a fishing lure 112. A strike member 102 may be pivotably attached to the fishing lure 112. The strike member 102 may have at least one water flow contact surface 104. Accordingly, during fishing operations, the fishing lure 112 may be retrieved through a water body 122 on a fishing line (not illustrated). Water 110 in the water body 122 may flow against the strike member 102 and the fishing lure 112. The turbulent force of the flowing water 110 against the water flow contact surface 104 of the strike member 102 may cause the strike member 102 to move at random orientations and repetitively strike the side of the fishing lure 112. This repetitive, random contact between the strike member 102 and the fishing lure 112 may create a vibrating motion and clicking or clapping sounds in the water 110 that serve as an attractant to fish and agitate or entice the fish to strike the fishing lure 112. In some embodiments, the water flow contact surface 104 on the strike member 102 may be configured to trap air against the surface of the fishing lure 112. The trapped air may amplify the clicking or clapping sounds produced in the water 110 as the strike member 102 repetitively strikes the fishing lure 112.

At least one strike member connector 108 may loosely connect the strike member 102 to the fishing lure 112. The strike member connector 108 may include any device, element, or combination of devices or elements suitable for attaching the strike member 102 to the fishing lure 112 such that the strike member 102 is capable of loosely moving at random orientations with respect to the fishing lure 112 as the fishing lure 112 is retrieved through the water 110. For example, and without limitation, in some embodiments, the strike member connector 108 may include at least one ring or at least one swivel. Accordingly, a strike member connector opening 105 may extend through the strike member 102. The ring or swivel of the strike member connector 108 may extend through the strike member connector opening 105. The ring or swivel of the strike member connector 108 may additionally extend through a similar strike member connector opening (not illustrated) in the fishing lure 112.

The fishing lure 112 may be a spoon lure 112a (FIG. 1) or a spinner lure 112b (FIGS. 2 and 3), for example and without limitation. The fishing lure 112 may be generally elongated with a proximal lure end 114 and a distal lure end 118. At least one fishhook 116 may be attached to the distal lure end 118. The proximal lure end 114 may be configured for attachment to a fishing line (not illustrated) attached to a fishing rod, typically in the conventional manner. The fishing lure 112 may include plastic, metal, and/or other rigid or semi-rigid material or materials. The strike member connector 108 may connect the strike member 102 to the fishing lure 112 at or adjacent to the proximal lure end 114.

The strike member 102 may be generally elongated with an attachment strike member end 106a, a free strike member end 106b and strike member sides 106c extending from the attachment strike member end 106a to the free strike member end 106b. The water flow contact surface 104 may be bound by and between the attachment strike member end 106a, the free strike member end 106b and the strike member sides 106c. The strike member 102 may include plastic, metal, and/or other rigid or semi-rigid material or materials.

In some embodiments, the water flow contact surface 104 of the strike member 102 may be at least partially concave and/or at least partially convex. In some embodiments, the water flow contact surface 104 may be uniformly concave or convex between the attachment strike member end 106a and the free strike member end 106b and/or between the strike member sides 106c. In some embodiments, the water flow contact surface 104 may have one or more concave portions and one or more convex portions to achieve the desired random orientational movement of the strike member 102 as the fishing lure 112 is retrieved through the water 110 in the water body 122.

As illustrated in FIGS. 1 and 4-6, in some embodiments, the strike member 102 may be generally elongated with the strike member sides 106c extending from the attachment strike member end 106a to the free strike member end 106b. Alternatively, the strike member 102 may have other shapes. For example, and without limitation, as illustrated in FIGS. 2 and 3, in some embodiments, the attachment strike member end 106a and the free strike member end 106b may be curved and convex. In other embodiments, the attachment strike member end 106a and the free strike member end 106b may be straight or concave.

Figure 4:
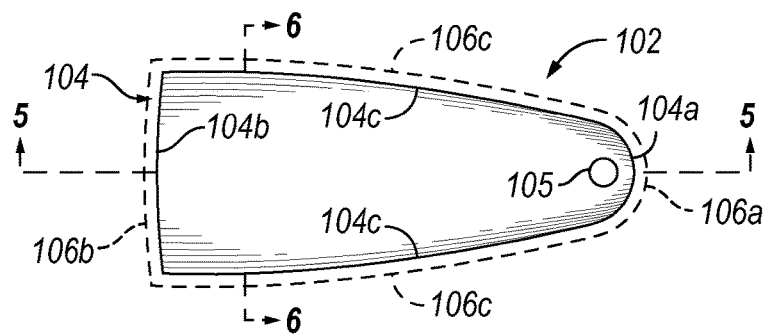
FIG. 4 illustrates a top view of a typical strike member of an exemplary fishing lure clapper device.
Figure 5:
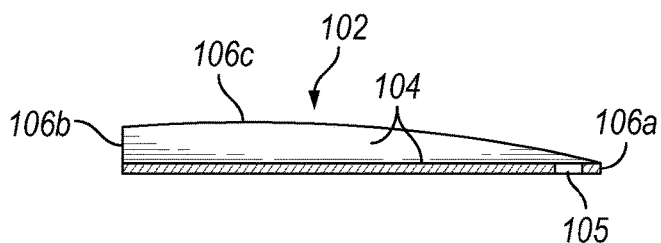
FIG. 5 illustrates a longitudinal sectional view of the exemplary strike member, taken along section lines 5-5 in FIG. 4.
Figure 6:
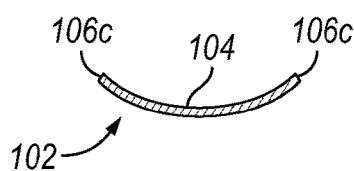
FIG. 6 illustrates a transverse cross-sectional view of the exemplary strike member, taken along section lines 6-6 in FIG. 4.

As illustrated in FIG. 4, in some embodiments, the water flow contact surface 104 of the strike member 102 may have a proximal surface end 104a and a distal surface end 104b. The proximal surface end 104a and the distal surface end 104b of the water flow contact surface 104 may be disposed at, proximate to or adjacent to the respective proximal lure end 114 and distal lure end 118 of the fishing lure 112. A pair of typically curved surface sides 104c may extend from the proximal surface end 104a to the distal surface end 104b.

As further illustrated in FIG. 4, in some embodiments, the water flow contact surface 104 may be disposed within the confines of the strike member 102. Accordingly, the proximal surface end 104a and the distal surface end 104b of the water flow contact surface 104 may be disposed inside the respective attachment strike member end 106a and free strike member end 106b of the strike member 102. In like manner, the surface sides 104c of the water flow contact surface 104 may be disposed inside the respective strike member sides 106c of the strike member 102. In some embodiments, the area of the water flow contact surface 104 may coincide in area with the strike member 102, with the proximal surface end 104a, the distal surface end 104b and the surface sides 104c of the water flow control surface 104 coinciding with the respective attachment strike member end 106a, free strike member end 106b and strike member sides 106c, respectively, of the strike member 102.

In some embodiments, the water flow contact surface 104 of the strike member 102 may have a parabolic shape. Accordingly, the distal surface end 104b may be longer than the proximal surface end 104a. The surface sides 104c may be convex and diverge away from each other as they extend from the proximal surface end 104a to the distal surface end 104b. The strike member connector opening 105 for the strike member connector 108 may extend through the strike member 102 at or adjacent to the proximal surface end 104a of the water flow contact surface 104.

One aspect of a fishing lure clapper device 100, comprises:

a strike member 102 including a water flow contact surface 104, the strike member 102 having an attachment strike member end 106a and an opposing free strike member end 106b, the attachment strike member end 106a being operable to enable loose attachment of the strike member 102 to a fishing lure 112, whereby flow of water 110 against the water flow contact surface 104 of the strike member 102 causes the strike member 102 to repetitively move at random orientations and strike the fishing lure 112, whereby repetitive contact between the strike member 102 and the fishing lure 112 generates vibration and clicking or clapping sounds, whereby the vibration and clicking or clapping sounds attract fish to the fishing lure 112 and agitate or entice the fish to strike the fishing lure 112.

In another aspect, the strike member 102 may be fabricated from metal.

In another aspect, the fishing lure 112 may be fabricated from metal.

In another aspect, the strike member connector 108 may include a split ring or a swivel.

In another aspect, the strike member 102 may be shorter than the fishing lure.

In another aspect, the strike member 102 may have varying length, size and weight based on the size and weight of the fishing lure 112.

One objective of the present invention is to produce sound with a fishing lure 112 in such a manner that fish will be agitated or enticed to strike the fishing lure 112.

Another objective is to attach the strike member 102 to the fishing lure 112 in such a manner that the strike member 102 repeatedly strikes the fishing lure 112.

Yet another objective is to produce a clapping sound when the water flow contact surface 104 of the strike member 102 strikes the fishing lure 112.

Yet another objective is to provide an inexpensive to manufacture fishing lure clapper device 100.

Those skilled in the art will recognize that spinner blades, jigs, and fishing lures having other means of luring fish to strike the lures typically lack a component to generate sound. Most of these lures rely on visual attractants or scents to attract fish. The present disclosure teaches a clapper device 100 that attaches to the fishing lure 112 and adds the component of sound, thereby increasing the number of bites or strikes and fish catch rates.

FIG. 1 illustrates a first embodiment of the device 100, showing an elongated strike member 102. The strike member 102 is configured to generate sounds by repeatedly striking an adjacently connected fishing lure 112 such as a spoon lure 112a or a spinner lure 112b, for example and without limitation. The strike member 102 may have at least one water flow contact surface 104. The water flow contact surface 104 can be at least partially concave and/or at least partially convex. In some embodiments, one or more portions of the water flow contact surface 104 may be concave and one or more portions of the water flow contact surface 104 may be convex. In some embodiments, the water flow contact surface 114 may be uniformly concave between the surface sides 104c and from the proximal surface end 104a to the distal surface end 104b. In other embodiments, the water flow contact surface 114 may be uniformly convex.

In some embodiments, the water flow contact surface 104 may be parabolic. The extent of the parabolic shape can vary. But in any case, the strike member 102 is typically not uniformly flat, which may not be effective for motion against the water 110 as the fishing lure 112 is retrieved through the water body 122.

The water flow contact surface 104 may be designed to partially resist flow of the water 110 in the water body 122, thereby causing movement of the strike member 102 at random orientations in a back-and-forth motion because of the force of the water 110 flowing against the water flow contact surface 104. The strike member 102 can have any of various shapes, including: rectangular, cubicle, spherical, or other shape that can be elongated and may have a parabolic water flow contact surface 104. Furthermore, in embodiments in which the water flow contact surface 104 is concave, as the strike member 102 strikes the fishing lure 112, air may be trapped inside the water flow contact surface 104. The trapped air may amplify the clapping sound generated from collision of the strike member 102 against the fishing lure 112.

As illustrated in FIG. 1, in some embodiments of the device 100, the strike member 102 may be attached to a spoon lure 112a. As illustrated in FIGS. 2 and 3, in other embodiments, the strike member 102 may be attached to a spinner lure 112b. The strike member 102 may have an attachment strike member end 106a and an opposing free strike member end 106b. The attachment strike member end 106a of the strike member 102 may include a lure connector opening 105 that facilitates connection of the strike member 102, typically via a strike member connector 108, with the fishing lure 112. The strike member connector 108 may facilitate attachment of the strike member 102 to the fishing lure 112. In some non-limiting embodiments, the strike member connector 108 may include a split ring or a swivel. The attachment strike member end 106a of the strike member 102 may attach to a correlating proximal lure end 114 of the spoon lure 112a, such that both the strike member 102 and the fishing lure 112 are arranged in generally parallel relationship when static and the strike member 102 moves at random orientations and strikes the fishing lure 112 as the strike member 102 is exposed to the flowing water 110 throughout retrieval of the fishing lure 112 through the water body 122 on a fishing line.

In typical use of the device 100, the proximal lure end 114 of the fishing lure 112 may be attached to a fishing line (not illustrated), typically wound on a reel attached to a fishing rod. After it is cast into the water body 122, the fishing lure 112 may be retrieved through the water 110 in the water body 122 on the fishing line, typically by operation of the rod and reel. As the fishing line pulls the fishing lure 112 through the water 110, the water 110 flows with respect to the moving fishing lure 112. Consequently, the strike member 102 may create turbulence in the flowing water 110. This may be at least partially a result of the water flow contact surface 104 creating greater turbulence and resistance to flow of the water 110. The strike member 102, typically smaller and lighter than the fishing lure 112, may move at random orientations and randomly strike the side of the fishing lure 112. This repetitive, random contact between the strike member 102 and the fishing lure 112 may create metal-on-metal or other clicking or clapping sounds with vibration which serve as attractant to fish and agitate the fish to strike the hook 116 on the distal lure end 118 of the fishing lure 112.

In some embodiments, as the concave water flow surface 104 strikes the fishing lure 112, air may become trapped in the water flow surface 104. Accordingly, the trapped air may amplify the clicking or clapping sound generated as the strike member 102 collides with the fishing lure 112. In essence, the force of the flowing water 110 against the water flow contact surface 104 of the strike member 102 may cause the strike member 102 to repetitively strike the side of the fishing lure 112, thereby amplifying the clicking or clapping sounds.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A fishing lure clapper device, the device comprising:
   a fishing lure,
   a strike member, the strike member having an attachment strike member end attachable to the fishing lure, an opposing free strike member end and at least one water flow contact surface between the attachment strike member end and the free strike member end,
   a strike member connector loosely attaching the strike member to the fishing lure,
   whereby flow of water against the at least one water flow contact surface of the strike member causes the strike member to repetitively move at random orientations and strike the fishing lure as the fishing lure is retrieved through the water in a water body,
   whereby repetitive contact between the strike member and the fishing lure generates vibration and clicking or clapping sounds in the water,
   whereby the vibration and clicking or clapping sounds attract fish to the fishing lure and agitate or entice the fish to strike the fishing lure.

2. The device of claim 1, wherein the strike member is fabricated from metal.

3. The device of claim 1, wherein the fishing lure is fabricated from metal.

4. The device of claim 1, wherein the strike member connector comprises a split ring or a swivel.

5. The device of claim 1, wherein the strike member is shorter than the fishing lure.

6. The device of claim 1, wherein the fishing lure comprises a spoon lure.

7. The device of claim 1, wherein the fishing lure comprises a spinner lure.

8. The device of claim 1, wherein the at least one water flow contact surface is at least partially concave.

9. The device of claim 1, wherein the at least one water flow contact surface is at least partially convex.

10. The device of claim 1, wherein the at least one water flow contact surface is uniformly concave.

11. The device of claim 1, wherein the at least one water flow contact surface is uniformly convex.

12. A fishing lure clapper device, the device comprising:
    a metal fishing lure, the fishing lure having a proximal lure end, an opposing distal lure end and at least one fishhook at the distal lure end;

a metal strike member, the strike member having an attachment strike member end attachable to the proximal lure end of the fishing lure, an opposing free strike member end and at least one parabolic water flow contact surface between the attachment strike member end and the free strike member end, a strike member connector loosely attaching the strike member to the fishing lure, whereby flow of water against the at least one water flow contact surface of the strike member causes the strike member to repetitively move at random orientations and strike the fishing lure as the fishing lure is retrieved through the water in a water body, whereby repetitive contact between the strike member and the fishing lure generates vibration and clicking or clapping sounds in the water, whereby the vibration and clicking or clapping sounds attract fish to the fishing lure and agitate or entice the fish to strike the fishing lure.

13. The device of claim 12, wherein the strike member connector comprises a split ring or a swivel.

14. The device of claim 12, wherein the strike member is shorter than the fishing lure.

15. The device of claim 12, wherein the fishing lure comprises a spoon lure.

16. The device of claim 12, wherein the fishing lure comprises a spinner lure.

17. The device of claim 12, wherein the at least one water flow contact surface is at least partially concave.

18. The device of claim 12, wherein the at least one water flow contact surface is at least partially convex.

19. A fishing lure clapper device, the device comprising:

a metal fishing lure, the fishing lure having a proximal lure end, an opposing distal lure end and at least one fishhook at the distal lure end;

a metal strike member, the strike member having an attachment strike member end attachable to the proximal lure end of the fishing lure, an opposing free strike member end and at least one parabolic water flow contact surface between the attachment strike member end and the free strike member end, the at least one parabolic water flow contact surface having a proximal surface end, a distal surface end longer than the proximal surface end and a pair of curved surface sides extending from the proximal surface end to the distal surface end, the at least one parabolic water flow contact surface uniformly concave between the surface sides and from the proximal surface end to the distal surface end;

a strike member connector loosely attaching the strike member to the fishing lure, whereby flow of water against the at least one water flow contact surface of the strike member causes the strike member to repetitively move at random orientations and strike the fishing lure as the fishing lure is retrieved through the water in a water body, whereby repetitive contact between the strike member and the fishing lure generates vibration and clicking or clapping sounds in the water, whereby the vibration and clicking or clapping sounds attract fish to the fishing lure and agitate or entice the fish to strike the fishing lure.

20. The device of claim 19, wherein the strike member connector comprises a split ring or a swivel.

* * * * *